(12) United States Patent
Ray et al.

(10) Patent No.: US 10,521,809 B2
(45) Date of Patent: Dec. 31, 2019

(54) SYSTEM AND METHOD FOR GROUPING TIME SERIES DATA FOR FORECASTING PURPOSES

(71) Applicant: Wal-Mart Stores, Inc., Bentonville, AR (US)

(72) Inventors: Shubhankar Ray, Union City, CA (US); Abhay Jha, Burlingame, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 1147 days.

(21) Appl. No.: 14/638,694

(22) Filed: Mar. 4, 2015

(65) Prior Publication Data

US 2016/0260111 A1 Sep. 8, 2016

(51) Int. Cl.
*G06Q 10/04* (2012.01)
*G06Q 30/02* (2012.01)
*G06K 9/62* (2006.01)
*G06Q 10/08* (2012.01)

(52) U.S. Cl.
CPC ....... *G06Q 30/0202* (2013.01); *G06K 9/6218* (2013.01); *G06Q 10/087* (2013.01)

(58) Field of Classification Search
CPC .......................... G06Q 10/087; G06Q 30/0202
USPC ....................................................... 705/7.31
See application file for complete search history.

(56) References Cited

U.S. PATENT DOCUMENTS

| | | | |
|---|---|---|---|
| 3,617,714 A | 11/1971 | Kernighan et al. | |
| 5,748,844 A | 5/1998 | Marks | |
| 6,307,965 B1 * | 10/2001 | Aggarwal | G06F 17/30598 382/225 |
| 6,826,569 B2 * | 11/2004 | Robertson | G06F 17/10 |
| 7,472,102 B1 * | 12/2008 | Heckerman | G06Q 10/087 706/45 |
| 8,346,783 B2 * | 1/2013 | Bai | G06Q 30/02 707/751 |
| 8,788,315 B2 * | 7/2014 | McMains | G06Q 10/06315 705/7.31 |
| 9,785,890 B2 * | 10/2017 | Sowani | G06Q 30/0201 |
| 2002/0077919 A1 * | 6/2002 | Lin | G06Q 10/0875 705/26.81 |
| 2010/0114554 A1 * | 5/2010 | Misra | G06Q 10/00 703/22 |
| 2013/0166350 A1 * | 6/2013 | Willemain | G06Q 30/0202 705/7.31 |

(Continued)

*Primary Examiner* — Folashade Anderson
(74) *Attorney, Agent, or Firm* — Bryan Cave Leighton Paisner LLP

(57) ABSTRACT

A system and method for grouping units for forecasting purposes is presented. A plurality of stock keeping units (SKUs) is presented to an embodiment. Initial medoids are chosen based on a vertex within a set of vertices, each of which represent a SKU. Then, each vertex within the set of vertices is associated with its closest medoid to form initial clusters. There can be a cap on the number of vertices in each cluster. Thereafter, an iterative algorithm is performed wherein a probability is assigned to each vertex. One or more vertices are randomly chosen, with the weights of the vertices weighting the random choice. The chosen one or more vertices are moved to another cluster. The algorithm is performed until no further improvements result from moving one or more vertices to another cluster. Other embodiments are also disclosed herein.

20 Claims, 8 Drawing Sheets

(56) References Cited

U.S. PATENT DOCUMENTS

2013/0339357 A1* 12/2013 Eldawy ............. G06F 17/30961
707/737
2015/0161545 A1* 6/2015 Willemain ....... G06Q 10/06315
705/7.25
2016/0239776 A1* 8/2016 Feng ................ G06Q 10/06315

* cited by examiner

SYSTEM AND METHOD FOR GROUPING TIME SERIES DATA FOR FORECASTING PURPOSES

TECHNICAL FIELD

This disclosure relates generally to clustering time-series, and relates more particularly to grouping stock keeping units (SKUs) for effective forecasting of sales for a retail business.

BACKGROUND

A retail business typically needs to stock items in a warehouse or store in order to sell the items. Storing too few of a particular item can be undesirable because if the item is sold out, then the retail business is not able to sell the item until it becomes in stock again. Storing too many of a particular item also can be undesirable because the amount of space in a warehouse or store is finite—storing too many of an item that does not sell takes away space from items that do sell. Therefore, it would be desirable to have a system that can more accurately forecast the sales of items for a retailer or distributor. In an ecommerce setting, the catalog size is much bigger. But a majority of items do not have enough sales to be forecasted on their own. Hence one has to use multivariate models that forecast groups of items together. How these groups are formed can have a significant impact on the quality of forecasts being generated.

BRIEF DESCRIPTION OF THE DRAWINGS

To facilitate further description of the embodiments, the following drawings are provided in which.

Figure 1:
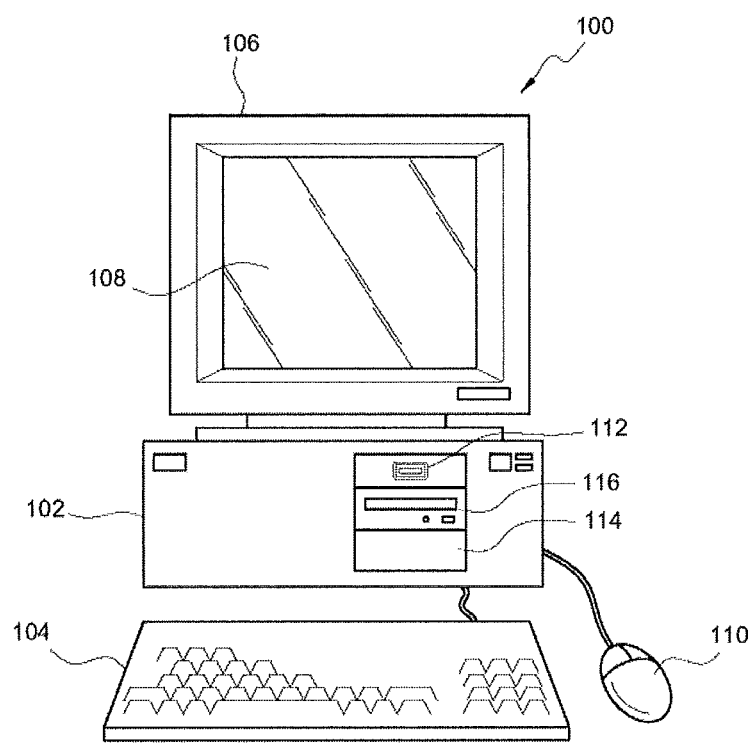
FIG. 1 illustrates a front elevation view of a computer system that is suitable for implementing an embodiment of the system.

For simplicity and clarity of illustration, the drawing figures illustrate the general manner of construction, and descriptions and details of well-known features and techniques might be omitted to avoid unnecessarily obscuring the present disclosure. Additionally, elements in the drawing figures are not necessarily drawn to scale. For example, the dimensions of some of the elements in the figures might be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological, order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but might include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

In one embodiment, a method might comprise: setting a maximum number of vertices per cluster of the clusters; for each of the clusters, determining if there are greater than the maximum number of vertices in the cluster; and if there are greater than the maximum number of vertices, then moving vertices within the cluster to a different cluster until the number of vertices in the cluster is less than or equal to the maximum number of vertices.

In one embodiment, a system might comprise: a user input device; a display device; one or more processing modules; and one or more non-transitory storage modules storing computing instructions configured to run on the one or more processing modules and perform the acts of: setting a maximum number of vertices per cluster of the clusters; for each of the clusters, determining if there are greater than the maximum number of vertices in the cluster; and if there are greater than the maximum number of vertices, then moving vertices within the cluster to a different cluster until the number of vertices in the cluster is less than or equal to the maximum number of vertices.

Figure 2:
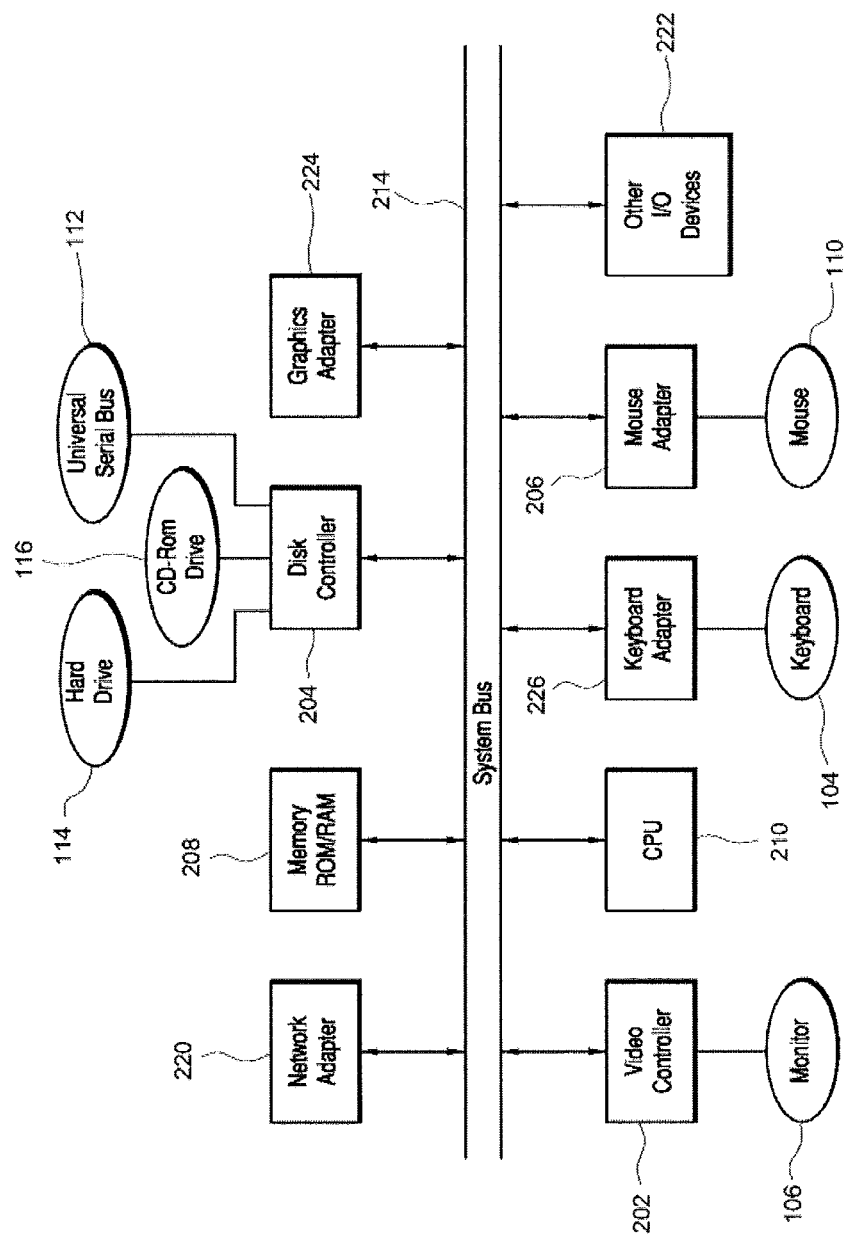
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) also can be appropriate for implementing the techniques described herein. Computer system 100 comprises chassis 102 containing one or more circuit boards (not shown), a Universal Serial Bus (USB) port 112, a Compact Disc Read-Only Memory (CD-ROM), Digital Video Disc (DVD) drive, or Blu-ray drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS) or Unified Extensible Firmware Interface (UEFI). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM, DVD drive, or Blu-ray drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise various versions/distributions of Microsoft® Windows® operating system (OS), Apple® OS X, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described herein.

Although computer system 100 is illustrated as a desktop computer in FIG. 1, there can be examples where computer system 100 can take a different form factor while still having functional elements similar to those described for computer system 100. In some embodiments, computer system 100 can comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 can comprise a portable computer, such as a laptop computer. In certain other embodiments, computer system 100 can comprise a mobile device, such as a smart phone or a tablet. In certain additional embodiments, computer system 100 can comprise an embedded system. It should also be understood that a particular configuration of computer system 100 might or might not contain each of the items shown in FIG. 1 or 2 or might in fact contain multiple of each of the items shown in FIG. 1 or 2. For example, certain implementations of computer system 100 might not contain a CD-ROM, DVD, or Blu-ray drive 116. Other implementations of computer system 100 might contain two CD-ROM, DVD, or Blu-ray drives 116. Other implementations of computer system 100 can contain 2 or more monitors 106. Other implementations of computer system 100 could contain no monitors. Other implementations of computer system 100 can contain equivalents to certain items. For example, hard drive 114 can be replaced or augmented by a solid-state drive (SSD). Computer system 100 could be a special-purpose machine, such as a set-top box or video game console. In other embodiments, computer system 100 can be a general-purpose computer.

Forecasting is a key problem encountered in inventory planning. In order to buy inventory in advance, retailers would like an estimate of the number of units a distinct item for sale (also known as a stock keeping unit or a "SKU") is going to sell in a certain time period. To clarify the difference between an item and a SKU, an item might be, for example, an iPad. But each specific configuration of an iPad (screen size, memory size, color, radio, and the like) is a different SKU. Each SKU typically has a unique identifier. Buying fewer units than is needed leads to lost sales opportunities, hence lower revenue, because items that could have been sold were not in stock. Buying too many units also can lead to lost sales opportunities because the cost of buying the unused inventory might not be compensated for by income from other sales to customers and can lead to lost opportunity costs (e.g., items that do not sell occupying space in a warehouse or store in place of items that could have been sold).

In general, a retailer wants to forecast the number of units it will sell, so it can accurately purchase the units on a timely basis. One method of forecasting examines past sales of an item. Past sales can reveal both local level and seasonal patterns. Local level patterns refer to sales in the recent past, as sales of a certain SKU in the recent past can be important in forecasting future sales. Seasonality refers to periodic events that can influence sales. Seasonality can refer both to general seasonality (e.g., sales are higher during the autumn because of the holiday season), and to product seasonality (some products are generally used only during certain times of the year.) For example, swimwear might be more popular in the summer, while Christmas decorations are more popular in the fall and winter.

Figure 4A:
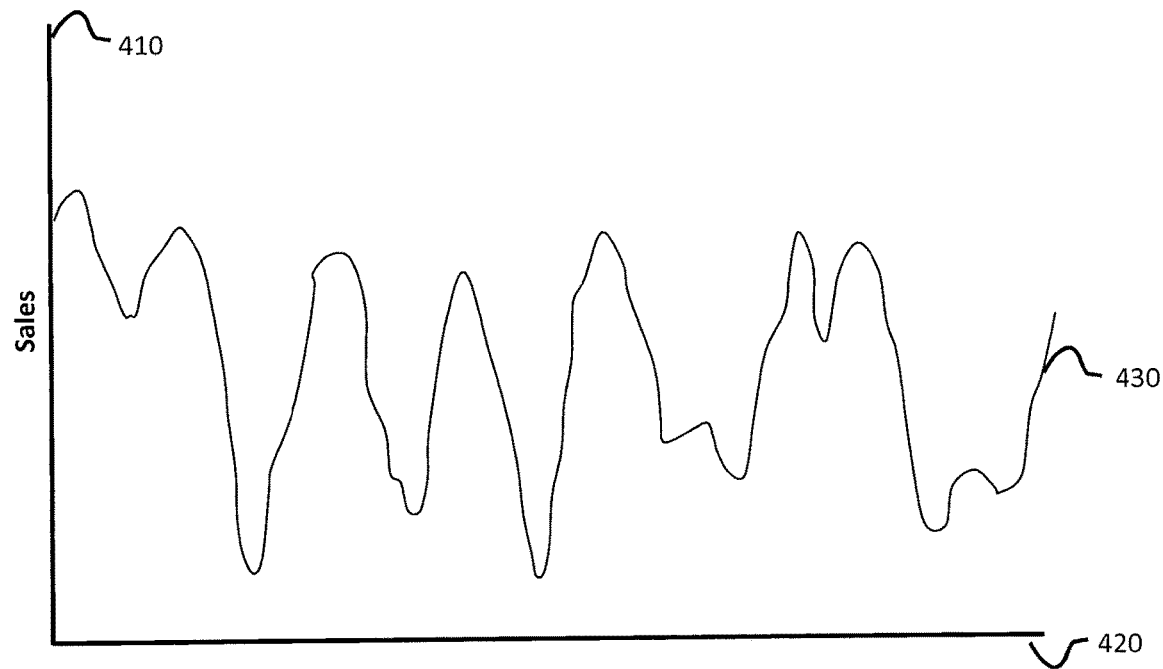
FIGS. 4A-4B illustrate an exemplary sales graph of a stock keeping unit.

With reference to FIG. 4A, a graph illustrating the sales of an exemplary product is illustrated. X-axis 420 is the time period for the sales. For example, FIG. 4A could be an annual graph, and each time period is weekly sales. In another embodiment, FIG. 4A could be a multi-year graph, and each time period could be monthly sales. Other combinations are also possible.

Y-axis 410 is the range of values for sales. Data series 430 represents the sales for each time period represented by X-axis 420. Y-axis 410 can be in a variety of different formats. In some embodiments, Y-axis 410 can represent actual sales. In some embodiments, Y-axis 410 can represent sales rankings. Using rankings as opposed to actual sales might result in more reliable and accurate data in some embodiments. For modeling purposes, two time-series might be considered similar if they rise and fall in unison. A rank correlation metric such as a Pearson correlation or a Spearman correlation can be used to measure similarity between time-series. For display purposes, Y-axis 410 can be linear or logarithmic.

As described above, a retailer would take data such as that illustrated in FIG. 4A and use the data to predict future sales. If the graph is relatively periodic, the retailer can forecast that more of the sales would occur during a certain time of the year and that fewer sales would occur during other times of the year. A few situations can occur that can make the use of such data to predict future sales difficult for some SKUs. For example, a possible situation can occur with electronic commerce ("eCommerce") retailers. Because eCommerce retailers generally store more SKUs than brick and mortar stores, there might not be enough sales data to model each SKU separately. In addition, eCommerce retailers often stock SKUs that are short-lived or have erratic data. For example, some eCommerce retailers have SKUs that sell out quickly, and there exists a time period where there is no data. In addition, there are SKUs that are short-lived, and thus there might not be available seasonal data from a previous year. Exemplary short-lived SKUs can include clothing (because of fashion trends, some items of clothing are sold only for a single season) and electronics (some forms of electronics, such as cell phone and TVs, are updated regularly, so a particular SKU might not have existed a year ago.)

Figure 4B:
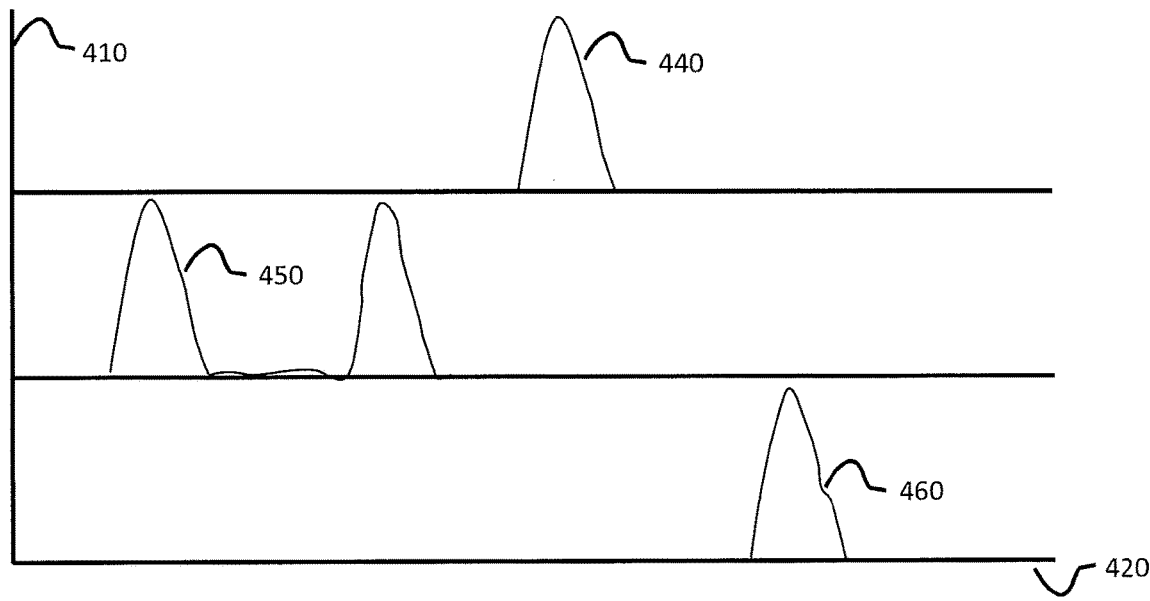

FIG. 4B illustrates three different SKUs that have such situations. The same X-axis 420 and Y-axis 410 that are present in FIG. 4A also are present in FIG. 4B. Data series 440, data series 450, and data series 460 represent the sales of three different items. Data series 440 has incomplete data. Sales are present for only a very short time period, with no sales before or after that time period. This type of data series can be indicative of a short-lived item. Because the item had sales only for a very short-period of time, a popular but short-lived item might be indicative of a product that is no longer made. Data series 450 has two sales spikes, with a period of zero or otherwise low sales in between the sales spikes. Such a data series might be indicative of an item that could not keep up with demand (between the two spikes), and is no longer being made. Or such a data series might be indicative of a seasonal item (explaining the sales spikes) that is no longer being made (explaining the lack of data after the second sales spike). Data series 460 is similar to data series 440 in that it has only a single spike. However, while data series 440 is similar to data series 430 in that a peak for data series 430 roughly coincides with a peak of data series 440, data series 460 has a peak that roughly coincides with a trough of data series 430. This fact can indicate both that the item in data series 460 is a short-lived item and that its sales do not correlate well with the item represented by data series 430. This type of behavior is discussed in further detail below.

One method of solving the above problems is to forecast items in groups (also known as clusters). In other words, instead of forecasting what each individual SKU will sell, one would place a SKU in a group with other SKUs. Then, one forecasts what the group of SKUs would sell. Data series 430, data series 440, and data series 450 could be forecast as a group. The forecast could then be used to order the proper number of items for each of the three SKUs. While there are currently existing methods and systems for grouping SKUs, it would be desirable to have a more accurate method and system of grouping SKUs for forecasting purposes.

There are several limitations on groups of SKUs that may be implemented. There should be both a lower-bound and an upper-bound on the number of SKUs in a group. A lower-bound can be desirable because too few SKUs in a group can result in one SKU adversely affecting the forecasting model by having a very large influence on a group. Too many SKUs in a group can be too large to compute efficiently. In some embodiments, an upper-bound is set at 200 SKUs per group.

In some traditional notions of grouping or clustering, there can be a requirement to place similar SKUs in the same groups. Thus, two similar items would not be placed in separate groups. However, in some embodiments, it is more important that dissimilar SKUs are not placed in the same group; similar items can be placed in separate groups, and embodiments will still operate correctly.

Returning to FIG. 4B, an example of dissimilar SKUs is seen in data series 430 of FIG. 4A and data series 460. As explained above, while data series 430 goes down, data series 460 goes up. This fact can be an indication that placing the item represented in data series 430 in a group with the item represented in data series 460 might not be ideal.

Mathematically speaking, the problems to be solved can be expressed using matrix mathematics. Matrix Y is an n×m matrix containing information about sales per time period. There are n rows $Y_i$, each with a length m. Each row represents data about a certain SKU. Each column represents the sales data for a certain time period. The time periods can be a variety of different time periods. In some embodiments, the time period is a day. In some embodiments, the time period is a week (thus, each column would represent the sales of a particular week for each item).

Matrix X is an n×l semantic feature matrix. The n rows each represent data about a certain SKU (as with matrix Y). The l columns each represent features of each SKU, such as item description, brand, category, and the like.

There is also a distance matrix D of size n×n which contains pairwise distance between items, i.e., how dissimilar their sales profiles are. The goal is to separate the n items into groups C such that (1) every item is in at least one group and (2) the items in a group are not too dissimilar (e.g., items 460 and 440 from FIG. 4B). Also, there should be enough data points between the items in the group as defined by a function $f$. A formula representing this relationship is as follows:

$$O(C) = \min_C \Sigma_{C \in C} \Sigma_{p,q \in C} D(p,q) + \lambda (\Sigma_{C \in C} |C| - n)$$

$$s.t. \forall C \in CL \leq |C| \leq U, f(C) \geq \delta, \text{ and } U_{C \in C} C = [n]$$

L, U, δ, λ are constants chosen based on experiments. The function $f$ can be a function that says we need at least some data for every time period. The function $f$ is monotonic. The formula serves to minimize the dissimilarity within a group so that a model that assumes that items in a group are similar are not adversely affected.

The distance matrix D is an n by n matrix that where each point (also known as a vertex) represents distance between the point and a chosen center.

Assuming there are no overlaps, the formula simplifies to the following:

$$O(C) = \min_C \Sigma_{C \in C} \Sigma_{p,q \in C} D(p,q)$$

O(C) is thus the sum of dissimilarities within a group.

Figure 5A:
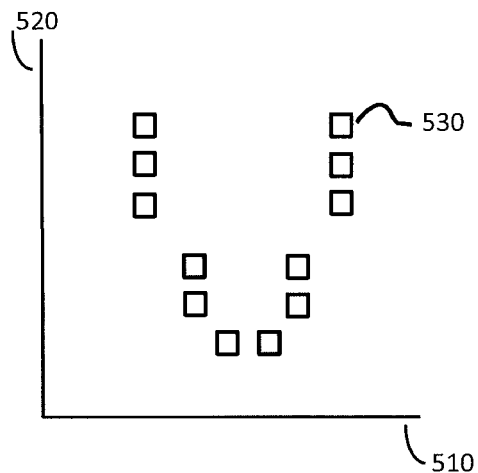
FIGS. 5A-5C illustrate an exemplary clustering algorithm.
Figure 5B:
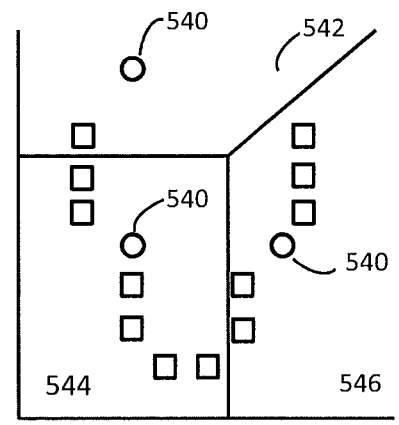
Figure 5C:
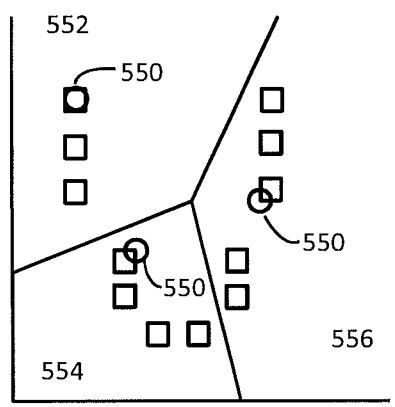

There are several different clustering algorithms that can be used. For example, the K-means algorithm is an iterative algorithm. With reference to FIG. 5A through 5C, an illustration of how an exemplary clustering algorithm operates. FIG. 5A shows a set of data. An X-axis 510 and a Y-axis 520 show what the vertices represent. For the purposes of FIG. 5A, the actual data being represented by each vertex is not important. Here, there is a set of 12 vertices 530, with the goal of placing each of the vertices into three different clusters. K different clusters are formed. As illustrated in FIG. 5B, K is equal to three, so three different points 540 are selected to be the center of a different cluster. Each vertex is then assigned to the cluster to which the vertex is closest to, resulting in the Voronoi diagram of FIG. 5B, where there are three clusters, cluster 542, cluster 544, and cluster 546.

The next step is illustrated in FIG. 5C. A centroid 550 for each cluster is found. The centroid is the mean of all the points within a cluster. Then, new clusters are formed around the centroids. This formation is accomplished by determining to which centroid each vertex is closest. In FIG. 5C, the result is cluster 552, cluster 554, and cluster 556. These steps of finding the centroid, and assigning each vertex to a cluster based on the centroid are repeated in a number of iterations. The iterations can either stop after a predetermined number of iterations or when the clusters no longer change. In the embodiment shown in FIG. 5C, it can be assumed that FIG. 5C is showing the final clusters after a number of iterations have been performed.

A problem with K-means is that local minima can adversely affect the clustering. In addition, there can be bad convergence properties such that the clusters are not what one might consider intuitive. This can be seen in FIG. 5C, because intuitively, one might place the U-shaped data points at the bottom of FIG. 5C in one cluster and the two straight lines of data points in a separate cluster, as opposed to separating the bottom set of data points as illustrated in FIG. 5C.

Another algorithm that attempts to solve that issue is partitioning around medoids (PAM). In PAM, vertices as chosen as the center point (or medoid). Each vertex is associated to the closest medoid. Then, for each medoid, the medoid is switched with a vertex to determine the total cost of the configuration. After each vertex has been switched with the medoid, the configuration with the lowest cost is chosen. Then new medoids are chosen based on the newly calculated configuration. This process is repeated until there is no change in medoids. While PAM is reliable and robust, it is very slow compared to other clustering methods, such as K-means, because the cost for each data point has to be calculated.

Another clustering algorithm is that proposed by Kernighan and Lin, commonly known as the KL-heuristic or KL-algorithm. While originally developed for the layout of electrical circuits, the KL-heuristic also can be used in retail clustering. The KL-heuristic is a local-search algorithm that is similar to the K-means algorithm. However, one vertex from each group is swapped in each iteration. An advantage of the KL-heuristic is that it is faster than the K-Means algorithm: while the K-means algorithm has a time complexity of O(nk), the time complexity of the KL heuristic is only O(n). A disadvantage of the KL heuristic is that much of the change happens after the first few steps, with little change happening afterward. While that feature has the benefit of converging quickly, it does not always have the most efficient result.

Because of the deficiencies of the above-described clustering algorithms, it can be desirable to have a more efficient clustering algorithm.

Figure 3:
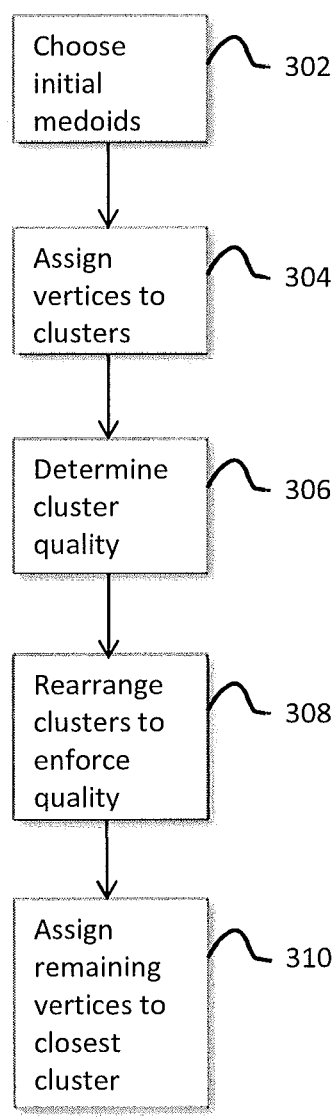
FIG. 3 is a flowchart illustrating the operation of a method of initializing clusters.

With reference to FIG. 3, a flowchart illustrating the operation of a method 300 of initializing the clusters of a clustering algorithm is disclosed. Method 300 is merely exemplary and is not limited to the embodiments presented herein. Method 300 can be employed in many different embodiments or examples not specifically depicted or described herein. In some embodiments, the procedures, the processes and/or the activities of method 300 can be performed in the order presented. In other embodiments, the procedures, the processes, and/or the activities of method 300 can be performed in any other suitable order. In still other embodiments, one or more of the procedures, the processes, and/or the activities of method 300 can be combined or skipped. In some embodiments, method 300 can be implemented by computer system 100 (FIG. 1).

The method to be described below can be referred to as the "OPTMOVE clustering algorithm." The OPTMOVE algorithm modifies the clusters with small local changes. The OPTMOVE algorithm seeks to move vertices between clusters to come up with better clusters. The vertices being moved can be chosen with a probability that is proportional to the improvement the move would make to the objective function. Thus, moves that do not change the objective are not chosen because their probability is zero.

An issue that can occur with a local heuristic such as OPTMOVE is that a few vertices, which might be outliers, might always be moved around because they have a higher influence on the objective function. The KL-heuristic handles such a problem by not moving a vertex, after being moved once, unless all other vertices have been moved. The OPTMOVE heuristic handles such a problem by using a randomized pick of a vertex is used, which ensures that any vertex that can make an improvement can be chosen.

The initial cluster medoids are first chosen (block 302). This process can be called "initialization." There are a variety of methods by which the initial clusters can be chosen. In one embodiment, a farthest-first heuristic is used. In a farthest-first heuristic, the initial medoids are chosen to be as far apart from each other as possible. Other methods also can be used to choose the initial medoids. Thereafter, for each vertex within the data set, the vertex is associated with the closest medoid to form clusters around each medoid (block 304). This process occurs until the clusters are of size less than L. Once all the clusters have reached size L, the cluster quality is enforced (block 306). The cluster quality is such that:

$$f(C) \geq \delta$$

Clusters that do not meet the cluster quality function are noted. In some embodiments, cluster quality can include the number of weeks or years for which there exists some threshold amount of sales data. This ensures that one can reliably compute seasonality for every week of the year. The closest cluster vertex pair are added to those clusters until all the clusters satisfy the quality constraint or the cluster vertex distance exceeds $\lambda$ (block 308). At this stage, some vertices might be too far from these clusters. Because overlap between clusters is allowed (and even preferred in some cases), closest vertices can be assigned to those clusters, even if those vertices are already present in other clusters. Thereafter, any vertices that are not assigned to a cluster are assigned in the closest-first fashion (e.g., they are assigned to the closest cluster) (block 310).

Figure 6:
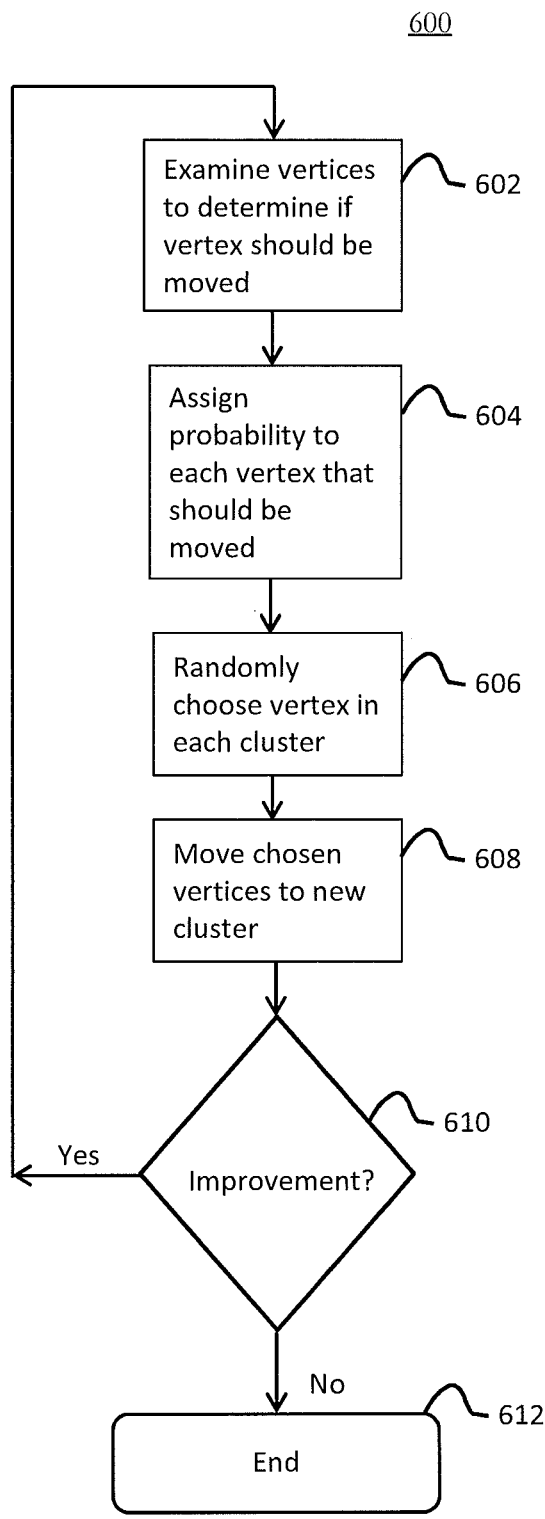
FIG. 6 is a flowchart illustrating the operation of an iterative clustering algorithm of an embodiment.

With reference to FIG. 6, a flowchart illustrating the operation of a method 600 of arranging vertices within clusters is disclosed. Method 600 is merely exemplary and is not limited to the embodiments presented herein. Method 600 can be employed in many different embodiments or examples not specifically depicted or described herein. In some embodiments, the procedures, the processes and/or the activities of method 600 can be performed in the order presented. In other embodiments, the procedures, the processes, and/or the activities of method 600 can be performed in any other suitable order. In still other embodiments, one or more of the procedures, the processes, and/or the activities of method 600 can be combined or skipped. In some embodiments, method 600 can be implemented by computer system 100 (FIG. 1).

The elements of method 600 can be performed after initialization method 300 is performed. After the initialization is performed, the clusters that are formed are often not ideal. Vertices are placed in one cluster, but being placed in another cluster can have better results. A similarity score can be calculated using one of a variety of techniques. The vertices are examined to determine if any improvement can be made to the clusters by moving vertices (block 602). A probability can be assigned to a vertex that indicates the probability of that vertex being chosen (block 604). The probability can be assigned based on the improvement the vertex would make. Therefore, a vertex that will not improve the cluster by being moved (e.g., a vertex close to the medoid of a cluster) might have a probability of being moved of zero.

After the probability has been assigned to each vertex in a cluster, a vertex is randomly chosen (block 606). In some embodiments, one vertex from each cluster is chosen. The algorithm used to randomly choose a vertex can be arranged to be a weighted random algorithm, with the weighting being based on the probability assigned in block 604. The vertex (or vertices) chosen by the random algorithm is then moved to another cluster (block 608). The cluster to which the vertex is moved can be chosen by any one of a variety of different methods. In some embodiments, the next closest cluster medoid to the chosen vertex is used to choose a destination cluster.

A tunable parameter of the approach can be a parameter called the "gap." The gap parameter specifies how long to wait after moving a vertex before moving the vertex again. One reason for using a gap is to avoid giving a few outlier vertices too much influence. A gap prevents moving those vertices for a few iterations, thus resulting in less influence on the algorithm. When using a gap, after a vertex is moved to another cluster, a flag or counter can be used to indicate that the vertex is not to be moved for a particular number of moves. For example, if an embodiment uses a gap set to 10, a vertex that is moved has a counter set to 10. In some embodiments, testing can be performed to determine an appropriate value for the gap. In some embodiments, the value for gap can be set at 20% of the number of vertices in a cluster. Thus, as an example, in an embodiment with a cap of 200 vertices per cluster, the gap counter can be set at 40. In some embodiments, the value for gap can be set at another percentage, such as 30% to 40%, of the number of vertices in a cluster. Thereafter, each time the method of FIG. 6 is performed, the counter is reduced by 1. As long as the counter is not zero, that particular vertex is not moved. This can be accomplished, for example, by setting the probability for a vertex to zero if the counter is greater than zero. However, when the counter reaches zero, the probability for that vertex is no longer zero, and that vertex can be included in the random choosing of block 606.

After the vertices have been moved in block 608, the new clusters are evaluated the objective defined above (O(C)). If the new arrangement of clusters has improved over a previous arrangement, then the operation can resume at block 602 (block 610). If the new arrangement does not result in an improvement, then it is assumed that no further improvements can be made and no more iterations are performed (block 612). In one embodiment, the final cluster arrangement can be the current cluster arrangement. In a different embodiment, the final cluster arrangement can be the immediately previous cluster arrangement.

Figure 7:
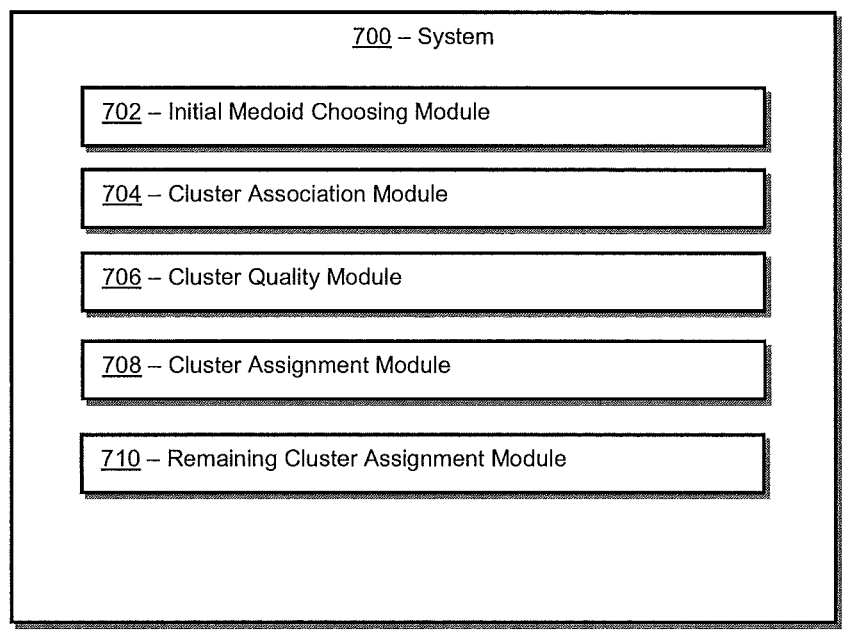
FIG. 7 is a block diagram illustrating a system capable of performing a method of initializing clusters.

Turning ahead in the figures, FIG. 7 illustrates a block diagram of a system 700 that is capable of performing disclosed embodiments. System 700 is merely exemplary and is not limited to the embodiments presented herein. System 700 can be employed in many different embodiments or examples not specifically depicted or described herein. In some embodiments, certain elements or modules of system 700 can perform various procedures, processes, and/or acts. In other embodiments, the procedures, processes, and/or acts can be performed by other suitable elements or modules.

In a number of embodiments, system 700 can include initial medoid choosing module 702. In certain embodiments, initial medoid choosing module 702 can perform block 302 (FIG. 3) of choosing medoids of initial clusters.

System 700 can include cluster association module 704. In certain embodiments, cluster association module 704 can perform block 304 of associating vertices with the closest medoid to form clusters.

System 700 can include cluster quality module 706. In certain embodiments, cluster quality module 706 can perform block 306 of determining the cluster quality of each cluster.

System 700 can include cluster assignment module 708. In certain embodiments, cluster assignment module 708 can perform block 308 of re-arranging clusters to enforce cluster quality.

System 700 can include remaining cluster assignment module 710. In certain embodiments, remaining cluster assignment module 710 can perform block 310 of assigning remaining vertices to clusters.

Figure 8:
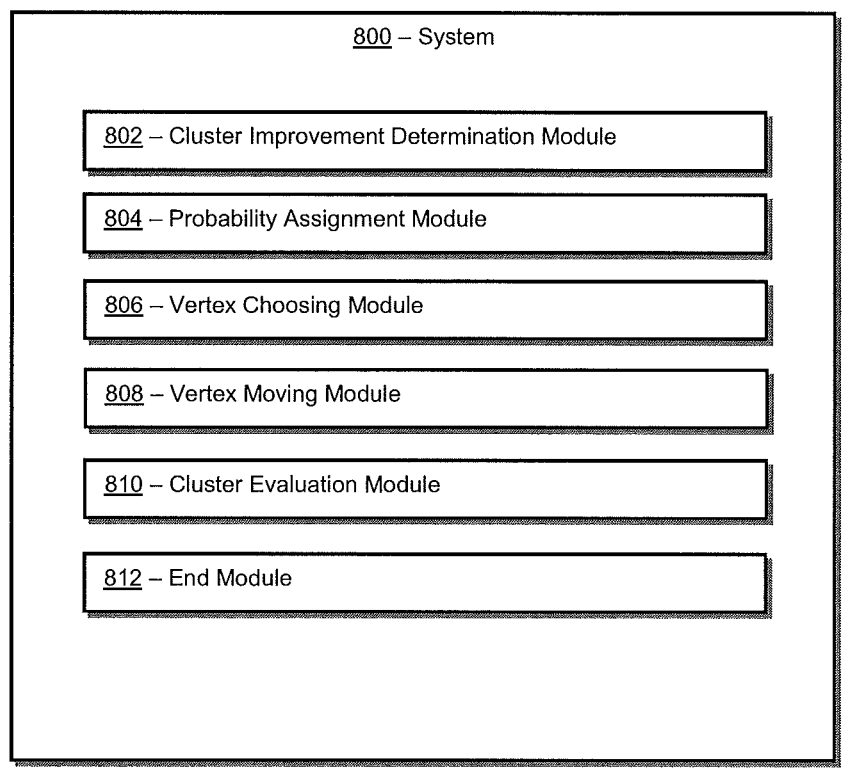
FIG. 8 is a block diagram illustrating a system capable of performing an iterative clustering algorithm of an embodiment.

Turning ahead in the figures, FIG. 8 illustrates a block diagram of a system 800 that is capable of performing disclosed embodiments. System 800 is merely exemplary and is not limited to the embodiments presented herein. System 800 can be employed in many different embodiments or examples not specifically depicted or described herein. In some embodiments, certain elements or modules of system 800 can perform various procedures, processes, and/or acts. In other embodiments, the procedures, processes, and/or acts can be performed by other suitable elements or modules.

In a number of embodiments, system 800 can include cluster improvement determination module 802. In certain embodiments, cluster improvement determination module 802 can perform block 602 (FIG. 6) of determining, for each vertex, whether moving the vertex can improve, its cluster.

System 800 can include probability assignment module 804. In certain embodiments, probability assignment module 804 can perform block 604 of assigning a probability to each vertex that should be moved.

System 800 can include vertex choosing module 806. In certain embodiments, vertex choosing module 806 can perform block 606 of choosing a vertex based on probability.

System 800 can include vertex moving module 808. In certain embodiments, vertex moving module 808 can perform block 608 of moving one or more vertices to one or more new clusters.

System 800 can include cluster evaluation module 810. In certain embodiments, cluster evaluation module 810 can perform block 610 of evaluating clusters to determine if the new clusters show an improvement.

System 800 can include end module 812. In certain embodiments, end module 812 can perform block 612 of ending the algorithm once no improvement has been found.

The above-described procedures have been found to behave in a manner that is superior to previous clustering algorithms. For example, one can use a factor called "within group dissimilarity" to determine how similar vertices within a cluster are. Within group dissimilarity is the sum of distances/dissimilarities between the items in the same group. The goal is to make this number as low as possible.

Using such a metric, it has been found that K-means and KL-heuristic reach their low level of dissimilarity faster than the OPTMOVE algorithm does. However, the OPTMOVE algorithm reaches a lower level of dissimilarity than do K-means and the KL-heuristic. In addition, a forecasting model based on OPTMOVE has been found to improve upon K-means and KL-heuristic by 4% to 8%.

The above-described procedures was described generically with respect to vertices and clusters. As such, the procedures can be used to group any sort of time-series data into clusters that can be usable for a large variety of predictive modeling purposes. One area of usage of particular interest is in retail forecasting. In such a usage, each vertex can represent a rank of a SKU at a particular time period. Each cluster of vertices can then represent a group of SKUs. Once a particular clustering of SKUs has been determined using the methods detailed above, SKUs within a cluster can be predicted to behave in a similar manner to other SKUs in that cluster. In such a manner, SKUs with incomplete data or new data can be purchased by a retailer using predictions based on better information than had the clusters of SKUs not been made in the above-described manner.

Although the above embodiments have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 can be modified, and that the foregoing discussion of certain of these embodiments does not necessarily represent a complete description of all possible embodiments. For example, one or more of the procedures, processes, or activities of FIGS. 1-8 can include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method comprising:
   receiving, at one or more processors through a system bus from a disk controller or a network adapter, a plurality of vertices to be placed in clusters;
   choosing, using the one or more processors, a plurality of initial medoids based on the plurality of vertices;
   assigning, using the one or more processors, each respective vertex of the plurality of vertices to a respective one of the clusters based on a respective distance between each respective vertex of the plurality of vertices and a respective medoid closest to each respective vertex of the plurality of vertices;

determining, using the one or more processors, a respective quality of each respective cluster of the clusters formed by a separate medoid and a separate set of closest vertices of the plurality of vertices to each separate medoid;

moving, using the one or more processors, one or more vertices of the plurality of vertices to a different one of the clusters based on the respective quality of each respective cluster of the clusters;

assigning, using the one or more processors, an unassigned vertex of the plurality of vertices to one of the clusters closest to the unassigned vertex;

performing, using the one or more processors, an iterative clustering process, the iterative clustering process comprising:

assigning, using the one or more processors, a respective probability to each respective vertex of the plurality of vertices, the respective probability based on a likelihood that moving the respective vertex improves a cluster of the clusters by increasing a similarity of two or more vertices within the cluster of the clusters;

randomly choosing, using the one or more processors, one or more randomly chosen vertices of the plurality of vertices, using the respective probability of each respective vertex of the plurality of vertices to weight randomness;

moving, using the one or more processors, the one or more randomly chosen vertices to another cluster of the clusters, based on a second distance from the one or more randomly chosen vertices to a medoid of the another cluster of the clusters; and setting, using the one or more processors, a respective counter to a number greater than zero for each respective vertex, as randomly chosen, of the one or more randomly chosen vertices, as moved;

repeating the iterative clustering process, wherein the respective probability assigned to each respective vertex of the plurality of vertices comprises a probability of zero when the respective counter for each respective vertex of the plurality of vertices is greater than zero;

decrementing, using the one or more processors, the respective counter each time the iterative clustering process is completed;

forecasting, using the one or more processors and the cluster of the clusters, sales of a first item represented by a first vertex of the plurality of vertices to create forecasted sales;

after completing the iterative clustering process, as repeated, and after decrementing the respective counter, purchasing, using the one or more processors, inventory based on the forecasted sales;

transferring at least a portion of the inventory, as purchased, to either a warehouse or a brick and mortar store; and releasing the inventory, as transferred to either the warehouse or the brick and mortar store, for sale.

2. The method of claim 1, wherein the iterative clustering process further comprises:

determining a first similarity score using each of the clusters and each vertex of the plurality of vertices within each of the clusters;

determining, for each respective vertex of the plurality of vertices, a respective likelihood that moving a respective vertex can result in an improvement in a specific cluster of the clusters;

determining a second similarity score using each of the clusters and each vertex of the plurality of vertices within each of the clusters; and determining when the second similarity score is improved over the first similarity score.

3. The method of claim 2, wherein repeating the iterative clustering process comprises:

repeating the iterative clustering process when the second similarity score is improved.

4. The method of claim 2 wherein:

each respective vertex of the plurality of vertices represents a respective stock keeping unit (SKU) of a retailer or a distributor.

5. The method of claim 4 wherein each respective vertex of the plurality of vertices represents a respective rank of a SKU.

6. The method of claim 4 wherein forecasting, using the one or more processors and the cluster of the clusters, the sales of the first item represented by the first vertex of the plurality of vertices comprises:

using the clusters in a retail forecasting model, wherein each SKU within a cluster of the clusters is forecast in a similar manner.

7. The method of claim 2, wherein the iterative clustering process further comprises:

determining when the second similarity score is not improved over the first similarity score; and when the second similarity score is not improved over the first similarity score, ending the iterative clustering process.

8. The method of claim 1 further comprising:

setting a maximum number of vertices per cluster of the clusters;

for each of the clusters, determining when there are greater than the maximum number of vertices in at least one cluster of the clusters; and when there are greater than the maximum number of vertices in the at least one cluster, moving vertices within the at least one cluster to a different cluster of the clusters until a number of vertices in the at least one cluster is less than or equal to the maximum number of vertices.

9. The method of claim 8 wherein the maximum number of vertices per cluster is 200.

10. The method of claim 1 wherein:

choosing the plurality of initial medoids comprises using a farthest-first metric to choose the plurality of initial medoids.

11. A system comprising:

a user input device;

a display device;

a system bus;

one or more processors; and one or more non-transitory storage devices storing computing instructions configured to run on the one or more processors and perform acts of:

receiving, at the one or more processors through the system bus from a disk controller or a network adapter, a plurality of vertices to be placed in clusters;

choosing, using the one or more processors, a plurality of initial medoids based on the plurality of vertices;

assigning, using the one or more processors, each respective vertex of the plurality of vertices to a respective one of the clusters based on a respective distance between each respective vertex of the plurality of vertices and a respective medoid closest to each respective vertex of the plurality of vertices;

determining, using the one or more processors, a respective quality of each respective cluster of the clusters formed by a separate medoid and a separate set of closest vertices of the plurality of vertices to each separate medoid;

moving, using the one or more processors, one or more vertices of the plurality of vertices to a different one of the clusters based on the respective quality of each respective cluster of the clusters;

assigning, using the one or more processors, an unassigned vertex of the plurality of vertices to one of the clusters closest to the unassigned vertex;

performing, using the one or more processors, an iterative clustering process, the iterative clustering process comprising:

assigning, using the one or more processors, a respective probability to each respective vertex of the plurality of vertices, the respective probability based on a likelihood that moving the respective vertex improves a cluster of the clusters by increasing a similarity of two or more vertices within the cluster of the clusters;

randomly choosing, using the one or more processors, one or more randomly chosen vertices of the plurality of vertices, using the respective probability of each respective vertex of the plurality of vertices to weight randomness;

moving, using the one or more processors, the one or more randomly chosen vertices to another cluster of the clusters, based on a second distance from the one or more randomly chosen vertices to a medoid of the another cluster of the clusters;

setting, using the one or more processors, a respective counter to a number greater than zero for each respective vertex, as randomly chosen, of the one or more randomly chosen vertices, as moved; and repeating the iterative clustering process, wherein the respective probability assigned to each respective vertex of the plurality of vertices comprises a probability of zero when the respective counter for each respective vertex of the plurality of vertices is greater than zero;

decrementing, using the one or more processors, the respective counter each time the iterative clustering process is completed;

forecasting, using the one or more processors and the cluster of the clusters, sales of a first item represented by a first vertex of the plurality of vertices to create forecasted s ales;

after completing the iterative clustering process, as repeated, and after decrementing the respective counter, purchasing, using the one or more processors, inventory based on the forecasted sales;

transferring at least a portion of the inventory, as purchased, to either a warehouse or a brick and mortar store; and releasing the inventory, as transferred to either the warehouse or the brick and mortar store, for sale.

12. The system of claim 11 wherein the iterative clustering process further comprises:

determining a first similarity score using each of the clusters and each vertex of the plurality of vertices within each of the clusters;

determining, for each respective vertex of the plurality of vertices, a respective likelihood that moving a respective vertex can result in an improvement in a specific cluster of the clusters;

determining a second similarity score using each of the clusters and each vertex of the plurality of vertices within each of the clusters; and determining when the second similarity score is improved over the first similarity score.

13. The system of claim 12 wherein repeating the iterative clustering process comprises:

repeating the iterative clustering process when the second similarity score is improved.

14. The system of claim 12, wherein the iterative clustering process further comprises:

determining when the second similarity score is not improved over the first similarity score; and when the second similarity score is not improved over the first similarity score, ending the iterative clustering process.

15. The system of claim 12 wherein:

each respective vertex of the plurality of vertices represents a respective stock keeping unit (SKU) of a retailer or distributor.

16. The system of claim 15 wherein each respective vertex of the plurality of vertices represents a respective rank of a SKU.

17. The system of claim 15 wherein forecasting, using the one or more processors and the cluster of the clusters, the sales of the first item represented by the first vertex of the plurality of vertices comprises:

using the clusters in a retail forecasting model, wherein each SKU within a cluster of the clusters is forecast in a similar manner.

18. The system of claim 11 wherein the computing instructions further comprise:

setting a maximum number of vertices per cluster of the clusters;

for each of the clusters, determining when there are greater than the maximum number of vertices in at least one cluster of the clusters; and when there are greater than the maximum number of vertices in the at least one cluster, moving vertices within the at least one cluster to a different cluster of the clusters until a number of vertices in the at least one cluster is less than or equal to the maximum number of vertices.

19. The system of claim 18 wherein the maximum number of vertices per cluster is 200.

20. The system of claim 11 wherein:

choosing the plurality of initial medoids comprises using a farthest-first metric to choose the plurality of initial medoids.

* * * * *